United States Patent [19]

Kono et al.

[11] Patent Number: 5,267,142
[45] Date of Patent: Nov. 30, 1993

[54] METHOD FOR PHASE-SYNCHRONIZED SPINDLE ROTATION CONTROL

[75] Inventors: Shinichi Kono; Masaaki Fukukura, both of Oshino, Japan

[73] Assignee: Fanuc Ltd, Minamitsuru, Japan

[21] Appl. No.: 623,446

[22] PCT Filed: Apr. 18, 1990

[86] PCT No.: PCT/JP90/00506
§ 371 Date: Dec. 20, 1990
§ 102(e) Date: Dec. 20, 1990

[87] PCT Pub. No.: WO90/12674
PCT Pub. Date: Nov. 1, 1990

[30] Foreign Application Priority Data

Apr. 26, 1989 [JP] Japan .................................. 1-104523
Jul. 27, 1989 [JP] Japan .................................. 1-192751

[51] Int. Cl.$^5$ ...................... G05B 13/02; G05B 11/32; G05B 11/18
[52] U.S. Cl. ................................ 364/166; 364/167.01; 364/474.11; 318/625; 318/595
[58] Field of Search ...................... 364/474.11, 167.01, 364/166; 318/593, 572, 571, 625, 595

[56] References Cited

U.S. PATENT DOCUMENTS

| | | | |
|---|---|---|---|
| 3,906,327 | 9/1975 | O'Callaghan et al. | 318/625 |
| 4,227,126 | 10/1980 | Denecke | 318/625 |
| 4,405,884 | 9/1983 | Weber | 318/625 |
| 4,565,950 | 1/1986 | Kikuno | 318/625 |
| 4,629,956 | 12/1986 | Nozawa et al. | 318/625 |
| 4,906,908 | 3/1990 | Papiernik et al. | 318/625 |
| 5,037,252 | 8/1990 | Hasegawa et al. | 318/625 |

FOREIGN PATENT DOCUMENTS 50-90878 7/1975 Japan .
64-16301 1/1989 Japan .

Primary Examiner—Jerry Smith
Assistant Examiner—Jim Trammell
Attorney, Agent, or Firm—Staas & Halsey

[57] ABSTRACT

A spindle rotation control method is provided capable of driving two spindles of a machine at the same speed with the same rotational phase. In response to a synchronizing control command from a numerical control apparatus, speed control is performed based on first and second speed commands calculated by using equations represented as a function of a synchronous speed command and parameters determined by the arrangement of a spindle rotational control system. When rotational speeds of the spindles reach the synchronous (same) rotational speed, first and second position deviation quantities corresponding to the synchronous rotational speed are calculated by using an equation represented as a function of a position control gain, and speed commands are converted into first and second moving commands, so as to perform position control loop processing based on the moving commands and the first and second spindle rotational quantities, and speed control based on a position control loop output. In response to input of a phase synchronizing control command, calculated values of rotational phases corresponding to the first and second rotational quantities measured from time points at which one-revolution signals for the first and second spindles are generated are subtracted from the position deviation quantities for the spindles, to decrease the rotational speeds of the spindles, so that rotational phases of the spindles reach the same phase as one another.

4 Claims, 5 Drawing Sheets

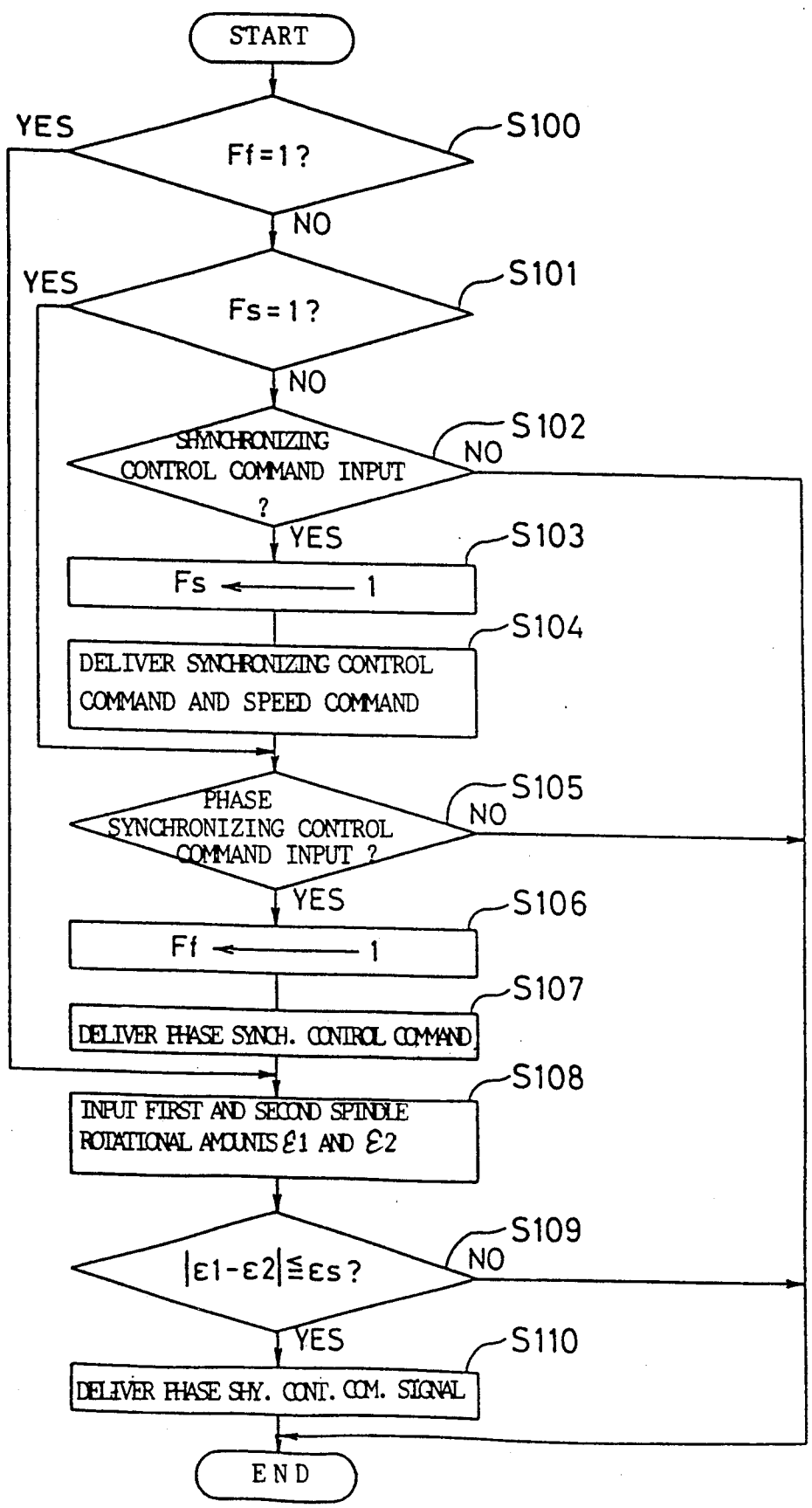

METHOD FOR PHASE-SYNCHRONIZED SPINDLE ROTATION CONTROL

TECHNICAL FIELD

The present invention relates to a spindle rotation control method applied to a machine having two spindles, and more particularly, to a spindle rotation control method for driving the spindles at the same rotational speed with the same rotational phase.

BACKGROUND ART

In a machine tool provided with two spindles, it is known to rotate the spindles at the same speed. For example, in a lathe of this kind, two spindles are rotated at the same speed when a shift is made from a state where one end of a workpiece is gripped by a first chuck coupled to one of the spindles, to a state where the other end of the workpiece is gripped by a second chuck coupled to the other spindle. When a workpiece having an anisotropic configuration with respect to the axis thereof is gripped by the second chuck, the workpiece can collide with the second chuck, if the rotational phases (rotational angle positions) of the chucks are different from each other, even though these chucks are rotated at the same speed. In this case, the workpiece can be damaged or deformed.

DISCLOSURE OF THE INVENTION

It is an object of the present invention to provide a spindle rotation control method capable of driving two spindles of a machine at the same rotational speed with the same rotational phase.

In order to achieve the above-described object, according to the present invention, there is provided a spindle rotation control method for performing speed control for first and second spindles of a machine such that the first and second spindles are rotated at the same rotational speed. The control method comprises the steps of (a) detecting rotational positions of the first and second spindles, (b) generating a one-revolution signal when each of the first and second spindles assumes a predetermined rotational position, (c) detecting first and second rotational quantities measured from those time points at which the one-revolution signals for the first and second spindles are respectively generated, when the first and second spindles are brought to be rotated at the same speed, and (d) reducing the rotational speeds of the first and second spindles in accordance with the first and second rotational quantities, respectively.

Preferably, this control method further includes a step (e) of performing speed control for the first and second spindles, after execution of the step (d), such that the first and second spindles are rotated at the same rotational speed again.

As described above, according to the present invention, speed control for the first and second spindles is performed so that both the spindles are rotated at the same rotational speed, and then the rotational speeds of these spindles are decreased in accordance with the first and second rotational quantities measured from the time points at which the one-revolution signals for the spindles are respectively generated. Accordingly, a deviation between rotational phases of the spindles can be eliminated. Preferably, after the rotational speeds of the first and second spindles are decreased so that the rotational phase deviation between the spindles is eliminated, speed control is performed again such that the spindles are rotated at the same speed. This makes it possible to rotate the spindles at the same rotational speed with the same rotational phase. Thus, in case, for example, that a shift is made from a state where a workpiece having an anisotropic configuration is gripped by a first chuck coupled to the first spindle of a lathe to a state where the workpiece is gripped by a second chuck coupled to the second spindle, by applying the spindle rotation control method of the present invention, collision of the workpiece with the second chuck can be positively prevented, whereby the workpiece can be prevented from being damaged and deformed.

BRIEF DESCRIPTION OF THE DRAWINGS

FIG. 5 is a flow chart showing a phase-synchronizing-control completion discriminating process which relates to a spindle rotation control method according to a second embodiment of the present invention and which is executed by a programmable machine controller of a numerical control apparatus.

BEST MODE OF CARRYING OUT THE INVENTION

Figure 1:
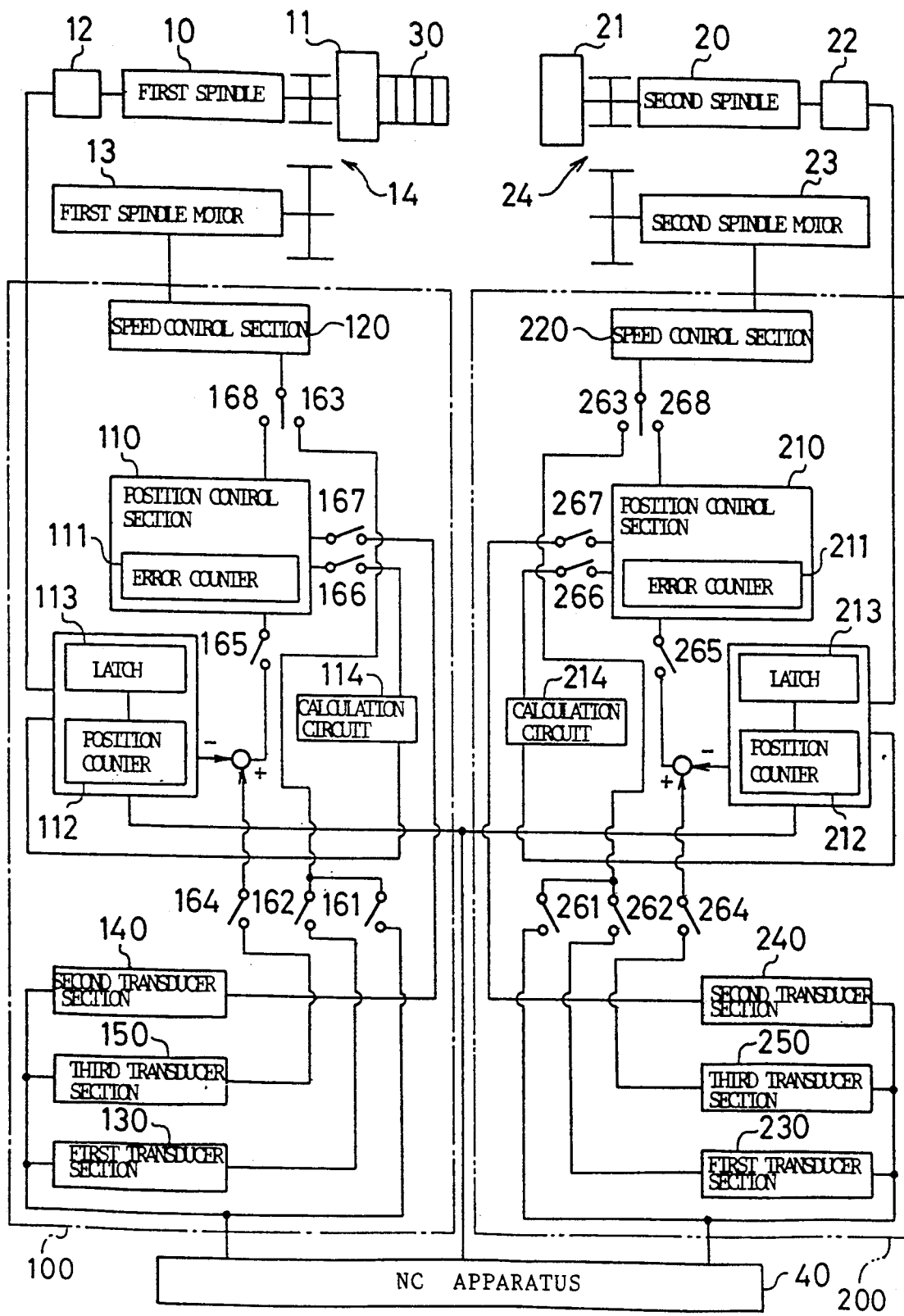
FIG. 1 is a functional block circuit diagram showing a control unit for embodying a spindle rotation control method according to a first embodiment of the present invention, together with peripheral elements thereof.

Referring to FIG. 1, a lathe, which is controlled by a spindle rotation control unit for embodying a method of a first embodiment of the present invention, comprises a first and second spindles 10 and 20. A first gripping section, having a first chuck 11 for gripping a workpiece 30, is coupled to one end of the first spindle 10 for rotation in unison with the spindle. Coupled to the other end of the first spindle 10 is a first position coder 12 which generates one pulse each time the first spindle is rotated through a predetermined rotational angle (for example, 4096 pulses per one revolution of the spindle), and which generates a one-revolution signal each time the first spindle assumes a predetermined rotational position. Furthermore, a first spindle motor 13 is operatively coupled to the first spindle 10 through a first transmission means 14 composed of a pair of gears, for instance. The arrangement on the side of the second spindle 20 is substantially the same as that on the side of the first spindle 10. Reference numerals 21–24 indicate elements respectively corresponding to the elements 11–14.

The spindle rotation control unit is operated under the control of a host control apparatus, e.g., a numerical control apparatus (NC apparatus) 40 in either one of an independent rotation mode where the first and second spindle motors 13, 23 are rotated, generally, at different speeds, and a synchronous rotation mode where both the motors are rotated at the same speed. The spindle rotation control unit is provided with a first and second spindle control circuits 100 and 200 which have substantially the same arrangement and which are respectively composed of microprocessors, etc.

The microprocessor (hereinafter referred to as first processor) forming the first control circuit 100 is functionally provided with a position control section 110, a speed control section 120, first to third transducer sections 130, 140 and 150, and first to eighth switches 161-168. The microprocessor (hereinafter referred to as second processor) forming the second control circuit 200 is also provided with similar functional elements 210, 220, 230, 240, 250 and 261-268. In actual, the first and second processors are arranged to execute position and speed control loop processing, etc., on a software basis, so as to achieve the functions of the aforesaid various elements.

More specifically, the first control circuit 100 includes the position control section 110 having a position deviation counter 111, a position counter 112 connected to the first position coder 12 for counting output pulses therefrom, a latch circuit 113 connected to the position coder 12 for storing a count value of the position counter 112 at an instant at which a one-revolution signal is generated, and a calculation circuit 114 connected to the elements 112, 113 for calculating a spindle rotational angle measured from that time point at which the one-revolution signal is generated. The first and second transducer sections 130, 140 are arranged to convert, in accordance with the following equations (1) and (2), a speed command supplied from the NC apparatus 40 into a first speed command and a first position deviation quantity, which are employed in the synchronizing control mode. The third transducer section 150 is arranged to convert the speed command from the NC apparatus 40 into a first moving command for the synchronizing control mode.

$$\text{First Speed Command} = \frac{\text{Speed Command} \times 60 \times \text{Gear Ratio}}{\text{Itp Period} \times 4096} \quad (1)$$

where a value of the first speed command represents the rotational speed per minute, and the itp period represents a speed command delivery period (pulse distribution period) of the NC apparatus 40, and the gear ratio represents a gear ratio between a pair of gears in case that the first transmitting means 14 is composed of these gears. The numerical value of "4096" represents the total number of pulses sent from the first position coder 12 during one revolution of the first spindle 10, and the numerical value "60" represents a constant for converting the unit of time from minute to second.

$$\frac{\text{First Position}}{\text{Deviation Quantity}} = \frac{\text{Speed Command}}{\text{Itp Period} \times \text{Position Gain}} \quad (2)$$

where the first position deviation quantity is represented by the number of pulses, and the position gain represents a position control gain in the position control section 110 of the first control circuit 100.

Describing further with reference to FIG. 1, the input sides of the first to third transducer sections 130, 140 and 150 are connected to the NC apparatus 40. The output side of the first transducer section 130 is connected to the speed control section 120 through the second and third switches 162 and 163. The output side of the second transducer section 140 is connected to the position deviation counter 111 through the seventh switch 167. The output side of the third transducer section 150 is connected through the fourth switch 164 to a positive input terminal of an adder having a negative input terminal thereof connected to the position counter 112 and an output terminal thereof connected to the position deviation counter 111 through the fifth switch 165. The position deviation counter 111 is connected to the spindle rotational-angle calculation circuit 114 through the sixth switch 166. Further, the NC apparatus 40 is connected to the speed control section 120 through the first and third switches 161, 163.

As described above, the second spindle control circuit 200 is constructed in the same manner as the first spindle control circuit 100, and hence a detailed description thereof will be omitted.

Figure 3:
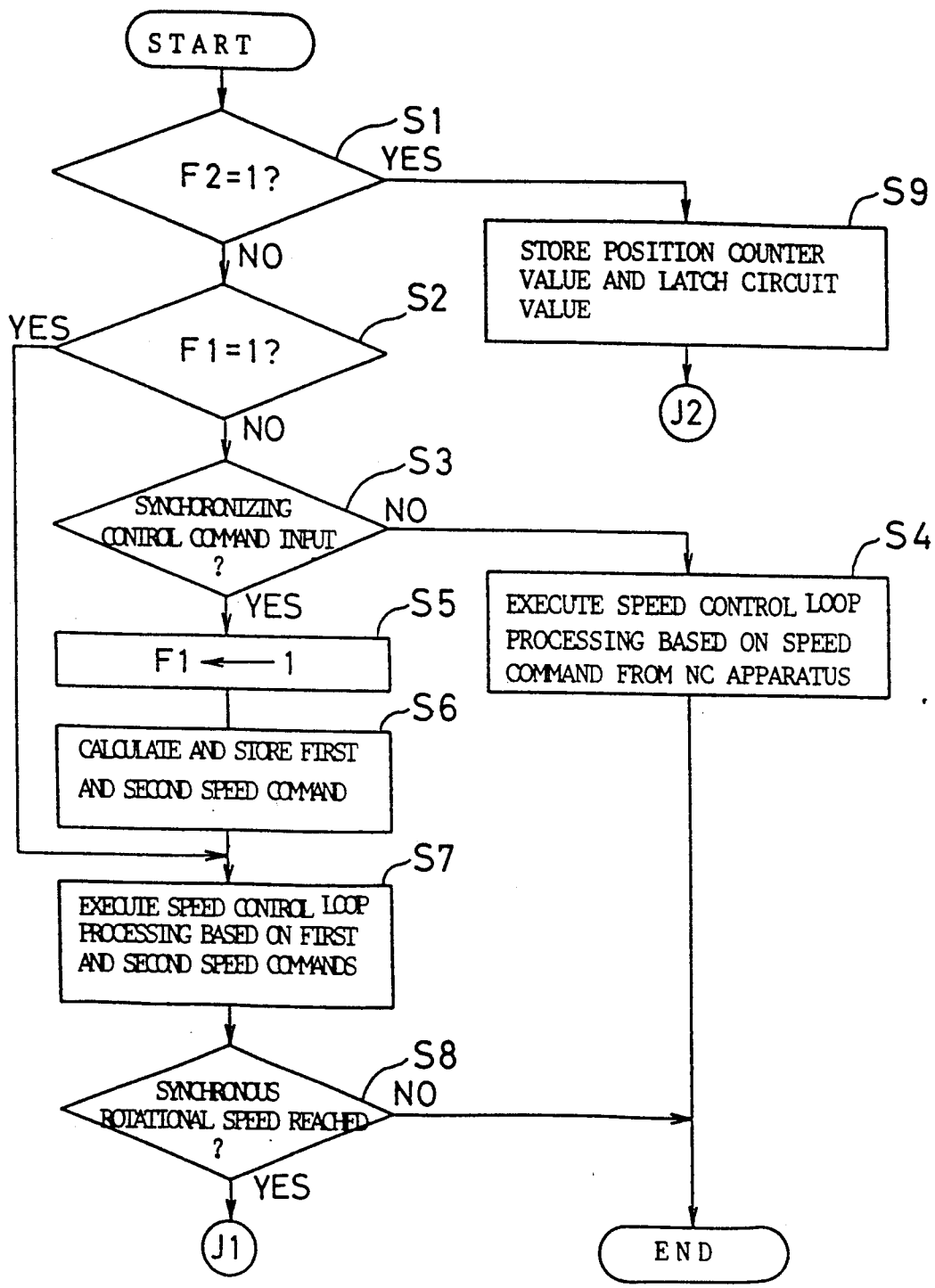
FIG. 3 is a flow chart showing part of a spindle rotation control process executed by first and second processors of the unit shown in FIG. 1.
Figure 4:
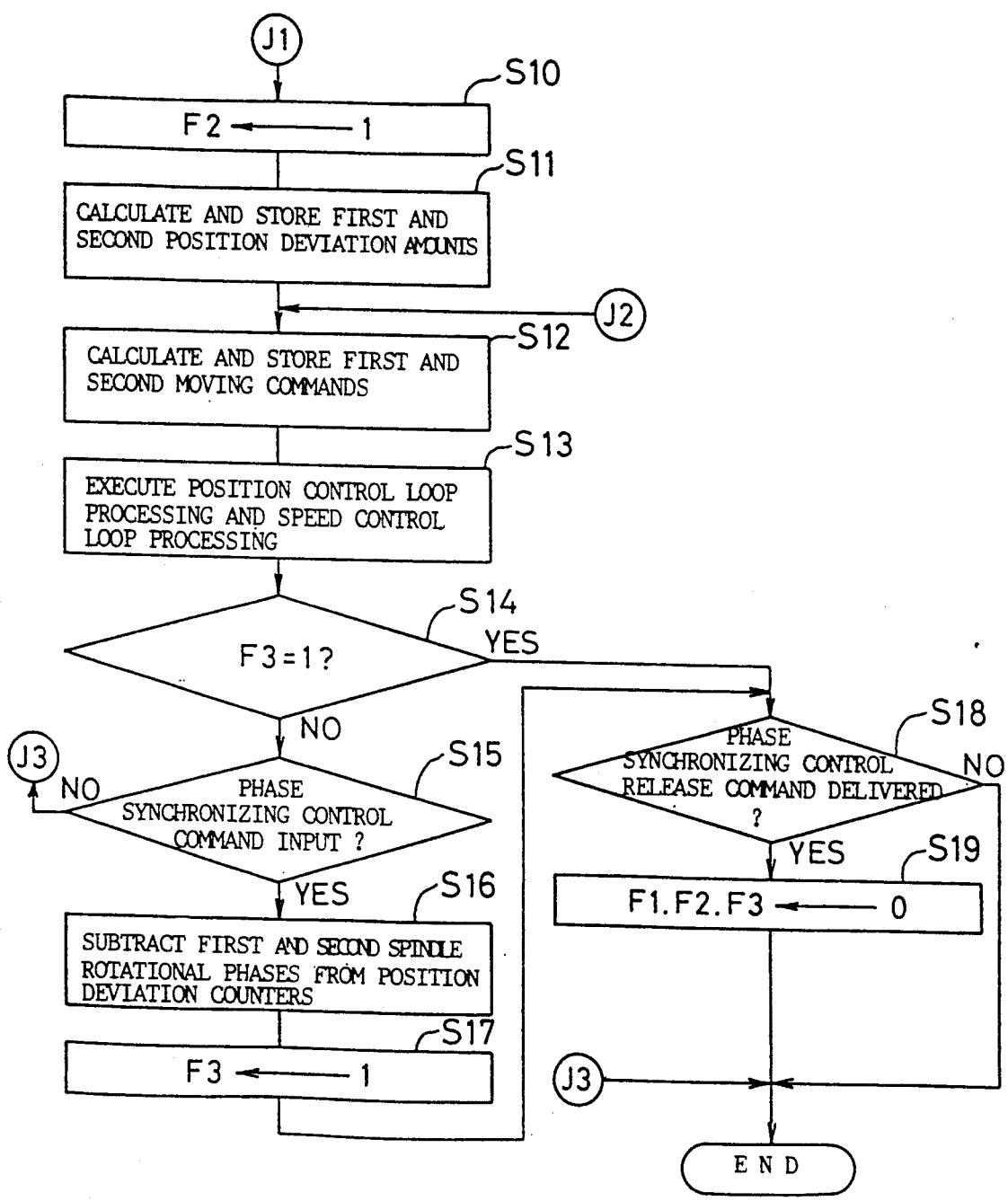
FIG. 4 is a flow chart showing the remaining part of the spindle rotation control process.

In the following, the operation of the spindle rotation control unit shown in FIG. 1 will be described with reference to FIGS. 2-4.

At first, each of the first and second processors of the spindle control unit executes initial setting. That is, a first flag F1 is reset to a value of "0" representing that the synchronizing control mode is not selected, a second flag F2 is reset to a value of "0" representing that the synchronous rotational speed is not reached, and a third flag F3 is reset to a value of "0" representing that a phase synchronizing control command is not delivered. After completion of the initial setting, both the processors repeatedly execute spindle control processing shown in FIGS. 3 and 4 at intervals of the itp period.

In each itp period, each of the first and second processors determines whether or not the second flag F2 has a value of "1" representing that the synchronous rotational speed is reached (step S1). If it is determined that the value of the second flag F2 is not "1", a determination is made as to whether or not the first flag F1 has a value of "1" representative of the synchronizing control mode (step 2). If it is determined that the first flag F1 has not the value "1" representative of the synchronizing control mode, a determination is made as to whether a synchronizing control command is supplied from the NC apparatus 40 (step 3). If such command is not supplied, the first and second processors operate in the independent control mode, so as to independently control the drive of the first and second spindle motors 13, 23 (step 4).

That is, the first processor closes the first and third switches 161, 163, opens the other switches 162 and 164-168, and resets the position deviation counter 111 to a value of "0". As a result, the speed command for the current itp period is supplied from the NC apparatus 40 to the first processor serving as the speed control section 120. In accordance with the speed command, the first processor executes the conventionally known speed-control loop processing for the first spindle motor 13. A rotational force of the first spindle motor 13 is transmitted to the first spindle 10 through the first transmission means 14, so that the first spindle is rotated. The second processor operates in a similar manner, to thereby rotate the second spindle 20.

In the independent control mode (until the time point of t1 in FIG. 2), the first and second processors respectively serving as the speed control sections 120, 220 are periodically supplied, in general, with different speed commands from the NC apparatus 40. Hence, both the processors periodically and independently execute the steps S1-S4 of FIG. 3, to control the drive of the first and second spindle motors 13, 23 so that the first and second spindles 10, 20 are rotated at different rotational speeds.

Figure 2:
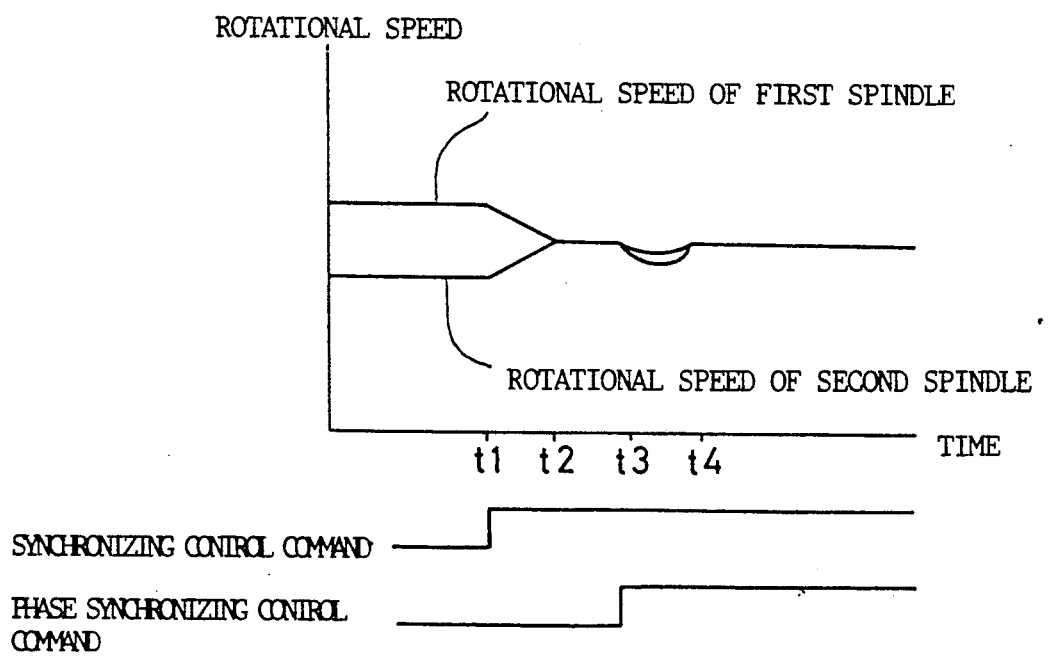
FIG. 2 is a graph showing changes of first and second spindle rotational speeds during spindle rotation control performed by the unit shown in FIG. 1.

If the synchronizing control command is delivered from the NC apparatus 40, e.g., at the time point of t1 in FIG. 2, the first processor determines this at the step S3 in the itp period immediately after the delivery of the same command. Then, the processor sets the first flag F1 to the value of "1" (step S5), turns off the first switches 161, 261, and turns on the second switches 162, 262. As a result, the operation mode of the spindle control unit is switched from the independent control mode to the synchronizing control mode.

In the synchronizing control mode, if the speed command (synchronous rotational speed command) for the current itp period is supplied from the NC apparatus 40 to the first processor serving as the first transducer section 130, the first processor calculates the first speed command in accordance with equation (1) given above, and stores the thus calculated speed command into a first register (not shown) built in this processor (step S6). Then, the first processor serving as the speed control section 120 executes the speed control loop processing on the basis of the first speed command supplied through the switches 162, 163 (step S7). Further, the processor determines whether or not the rotational speed of the first spindle 10 reaches the synchronous rotational speed (step S8). If the synchronous rotational speed is not reached, the processing for the current itp period is completed. In the subsequent itp periods, the result of determination at the step S2 following the step S1 becomes affirmative, so that the speed control loop processing is executed at the step S7. In the synchronizing control mode, the second processor serving as the speed control section 220 operates in the same manner as in the case of the first processor. As a result, the rotational speeds of the first and second spindles 10, 20 gradually change toward the synchronous rotational speed. Thereafter, e.g., at the time point of t2 in FIG. 2, both the spindles reach the synchronous rotational speed (more strictly, rotational speeds falling within a predetermined rotational-speed region including the synchronous rotational speed and set beforehand by using an allowable error).

If it is determined at the step S8 that the synchronous rotational speed is reached, each of the first and second processors sets the second flag F2 to the value "1" (step S10). Next, in accordance with equation (2) given above and a similar equation, the processors, serving as the second transducer sections 140 and 240, calculate the first and second position deviation quantities which correspond to the synchronous rotational speed. The seventh switches 167, 267 are closed for a short period of time, so as to store the calculated quantities to the position deviation counters 111, 211 (step S11). Then, the second and third switches 162, 163 (262, 263) are opened, and the fourth, fifth and eighth switches 164, 165 and 168 (264, 265 and 268) are closed.

Next, the first and second processors serving as the third transducer sections 150, 250 convert the speed command for the current itp period supplied from the NC apparatus 40 into the first and second moving commands, and stores these moving commands in their built-in second registers (not shown), respectively (step S12). Whereupon, the first and second moving commands for the current itp period are supplied from the second registers through the fourth switches 164, 264 to the positive input terminals of the position deviation counters 111, 211. On the other hand, these counters are supplied at their negative input terminals from the position counters 112, 212 with the rotational quantities of the first and second spindles 10, 20 for the current itp period. The first and second processors serving as the position control sections 110, 210 execute the position control loop processing on the basis of the first and second moving commands and the first and second spindle rotational quantities, respectively (step S13). The position control loop outputs are supplied to the speed control sections 120, 220 through the eighth switch 168, 268. The first and second processors serving as these speed control sections execute the speed control loop processing based on the position control loop outputs (speed commands) (step S13). As a result, the spindles 10 and 20 are rotated at the same synchronous rotational speed, with these spindles subjected to the position control.

Next, each of the first and second processors determines whether or not the third flag F3 has a value of "1" representing that the phase synchronizing control command has been sent (step S14). If the value of the third flag F3 is not "1", a determination is made as to whether or not the phase synchronizing control command is supplied from the NC apparatus 40 (step S15). If such command is not supplied, the processing for the current itp period is completed.

When it is determined at the step S1 in the next itp period that the value of the second flag F2 is "1", the first processor enters the step S9 to cause built-in third and fourth registers (not shown) to store the current value of the position counter 112 representing the rotational position of the first spindle 10, and the value of the latch circuit 113 representing the first-spindle rotational position at an instant at which the one-revolution signal is generated, respectively. Then, the first processor executes the steps S12-S15. The second processor operates in the same manner.

Thereafter, if the phase synchronizing control command is sent from the NC apparatus 40, e.g., at the time point of t3 in FIG. 2, the first processor determines this at the step S15 in the itp period immediately after the delivery of the same command. The first processor serving as the calculation circuit 114 subtracts the value of the latch circuit 113 from the current value of the position counter 112, so as to calculate a current rotational phase (first spindle rotational-angle quantity measured from an instant at which the one-revolution signal is generated) of the first spindle 10. Likewise, the second processor also calculates a current rotational phase of the second spindle 20. Then, both the processors close the sixth switches 166 and 266, and substracts the calculated values of the first and second spindle rotational phases from the position deviation counters 111 and 211, respectively (step S16). With decrease of the position deviation counter values, the rotational speeds of both the spindles decrease such that the one-revolution signals for the first and second spindles 10 and 20 occur at the same time point, in other words, such that the rotational phases of both the spindles are in agreement with each other (refer to FIG. 2). Next, the processors set the third flag F3 to the value "1" which represents that the phase synchronizing control command has been sent (step S17), and determine whether or not a phase synchronizing control release command is supplied from the NC apparatus 40 (step S18). If the release command is not supplied, the processing for the current itp period is completed.

In the next and later itp periods, the steps S1, S9 and S12-S14 are repeatedly executed. As a result, the first and second moving commands, which correspond to the synchronous rotational speed command supplied from the NC apparatus 40, are supplied to the position deviation counters 111 and 112, respectively. The rotational speeds of the first and second spindles 10 and 20 are returned to the synchronous rotational speed, e.g., at the time point of t4 in FIG. 2. At this time, both the spindles are rotated with the same phase. Subsequently, when the phase synchronizing control release command is sent from the NC apparatus 40, both the processors determine this at the step S18 in the itp period immediately after the delivery of the same command, and resets the first to third flaps F1-F3 to a value of "0" (step S19). As a result, the next and later itp periods, the speed control in the independent control mode is executed in accordance with the speed command supplied from the NC apparatus 40 (steps S1-S4).

In the following, a spindle rotation control method according to a second embodiment of the present invention will be described.

The method of the second embodiment is basically the same as that of the first embodiment. A spindle rotation control unit (not shown) for embodying the method of the second embodiment is substantially the same in construction as the unit shown in FIG. 1, and is arranged to execute substantially the same control processing as the spindle rotation control processing shown in FIGS. 3 and 4. In the below-mentioned description of the spindle rotation control unit, etc., FIG. 1 will be referred to for convenience.

A primary feature of the method of the second embodiment resides in the provision of a step for discriminating the completion of control for synchronizing the rotational phases of the first and second spindles with each other. To this end, a processor (hereinafter referred to as PMC processor), not shown, built in the programmable machine controller provided on the side of the NC apparatus 40, is arranged to execute phase-synchronizing-control completion discrimination processing shown in FIG. 5. Further, the first and second processors of the spindle rotation control unit are arranged to execute, prior to execution of the step S1 of FIG. 3, a step (not shown) of supplying the NC apparatus 40 with signals representative of rotational quantities (hereinafter referred to as rotational quantities $\epsilon 1$, $\epsilon 2$) respectively measured from time points at which the one-revolution signals for the first and second spindles 10 and 20 are generated, so as to provide these quantities for the discrimination processing of FIG. 5 performed by the PMC processor. To this end, the calculation circuits 113, 213 of the spindle rotation control unit are connected to the NC apparatus 40 through wires, not shown in FIG. 1.

Next, the operation of the PMC processor will be described with reference to FIG. 5.

At first, the PMC processor performs initial setting. That is, the PMC processor resets a fourth flag Ff to a value of "0" which represents that the phase synchronizing control command is not supplied, and resets a fifth flag F5 to a value of "0" which represents that the synchronizing control command is not supplied. Then, the PMC processor repeatedly executes the discrimination processing shown in FIG. 5 at intervals of the itp period.

In each itp period, the PMC processor determines whether or not the fourth flag Ff has the value "1" indicating that the phase synchronizing control command has been supplied (step S100). If the value of the fourth flag Ff is not "1", a determination is made as to whether or not a fifth flag Fs has a value of "1" representing that the synchronizing control command has been supplied (step S101). If the value of the fifth flag Fs is not "1", the PMC processor further determines whether the synchronizing control command has been supplied (step S102). If the same command is not inputted as yet, the processing for the current itp period is completed. In this case, the first and second processors of the spindle rotation control unit execute the speed control loop processing (corresponding to the step S4 in FIG. 3), in accordance with the speed command from the NC apparatus 40.

When an operator inputs the synchronizing control command through a keyboard of a manual data input device (not shown) provided in the NC apparatus 40, the PMC processor determines this at the step S102 in the itp period immediately after the input of the same command, and sets the value of the fifth flag Fs to "1" (step S103). Further, the PMC processor delivers the synchronizing control command and the synchronous rotational speed command to the spindle rotation control unit (step S104). In response to this, the first and second processors of the spindle rotation control unit execute the speed control loop processing (corresponding to the step S7 in FIG. 3) in accordance with the first and second speed commands calculated on the basis of the synchronous rotational speed command from the PMC processor. Following the step S104, the PMC processor determines whether or not the phase synchronizing control command is supplied (step S105). If the command is not supplied, the processing for the current itp period is completed. In the next and later itp periods, the PMC processor executes the steps S100, S101 and S105, and then waits the input of the phase synchronizing control command.

When the phase synchronizing control command is inputted by operator's keyboard operation, the PMC processor determines this at the step S105 in the itp period immediately after the input of the same command, sets the fourth flag Ff to the value "1" which represents the input of the phase synchronizing control command (step S106), and delivers this command to the spindle rotation control unit (step S107). In response to this, the first and second processors of the spindle rotation control unit execute processing (corresponding to the step S16 in FIG. 4) by which the rotational quantities $\epsilon 1$ and $\epsilon 2$ measured from time points at which the one-revolution signals for the first and second spindles 10 and 20 are generated are subtracted from the position deviation counters 111 and 211, respectively.

Following the step S107, the PMC processor receives the rotational quantities $\epsilon 1$, $\epsilon 2$ of the first and second spindles 10 and 20 delivered from the first and second processors (step S108), and determines whether or not the absolute value $|\epsilon 1 - \epsilon 2|$ of the difference between the rotational quantities of the spindles 10 and 20 is equal to or less than an allowable value $\epsilon s$ set beforehand (step S109). If the absolute value $|\epsilon 1 - \epsilon 2|$ exceeds the allowable value $\epsilon s$, the processing for the current itp period is completed. In the next and later itp periods, the PMC processor waits a decrease of $|\epsilon 1 - \epsilon 2|$.

When it is determined at the step S109 in a certain itp period that the absolute value $|\epsilon 1 - \epsilon 2|$ is equal to or less than the allowable value $\epsilon s$, the PMC processor provides the spindle rotation control unit with a signal indicating the completion of the phase synchronizing control, whereby the discrimination processing of FIG. 5 is completed.

The present invention is not limited to the first and second embodiments mentioned above, and various modifications thereof may be made.

For example, in the second embodiment, the completion of the rotational phase synchronizing control is determined when the absolute value $|\epsilon 1 - \epsilon 2|$ of the difference between the first and second spindle rotational quantities is equal to or less than the allowable value $\epsilon s$. Depending upon the arrangement of the machine to which the method of the present invention is applied, however, completion of the rotational phase synchronizing control may be determined when the absolute value of the difference between stored values of the position deviation counters 111, 211 becomes equal to or less than an allowable value. That is, in a machine of the type where the gear ratio of the first transmission means 14 (generally, the ratio between the rotational speed of the first spindle motor 13 and that of the first spindle 10) is the same as the gear ratio of the second transmission means 24 (the ratio between the rotational speed of the second spindle motor 23 and that of the second spindle 20), and the position gains for the position control loop processing executed by the first and second control circuits 100, 200 are the same with each other, both the position deviation counter values become identical with each other, if the rotational phases of the spindles are the same with each other at an instant at which the rotational speeds of the spindles are returned to the synchronizing rotational speed after the decelerating operation of the first and second spindles. Thus, in the machine of this kind, it is possible to determine the completion of the phase synchronizing control based on the position deviation counter values.

In the embodiments, the synchronizing control command and the phase synchronizing control command are inputted manually. However, only the synchronizing control command may be inputted manually. In this case, the synchronizing rotation completing signal is sent from each of the first and second processors when it is determined at the step S8 of FIG. 3 that the synchronous rotational speed is reached, and the phase synchronizing control command is sent to the spindle rotation control unit from the PMC processor when the supply of the same signals from both the processors is completed.

Furthermore, the aforementioned shift between the workpiece gripping states (operation of changing the gripped side) in the lathe, etc., to which the present invention is applied, may be made in response to the phase synchronizing control completion signal supplied from the PMC processor. Further, a message indicating permission of the workpiece gripping state shift may be displayed when the phase synchronizing control completion signal is generated.

We claim:

1. A spindle rotation control method, said method comprising the steps of:
   (a) controlling rotational speeds of first and second spindles of a machine such that the first and second spindles are rotated at a same rotational speed;
   (b) detecting rotational positions of the first and second spindles;
   (c) generating a one-revolution signal when the rotational positions detected in said step (b) for each of the first and second spindles assume a predetermined rotational position;
   (d) detecting first and second rotational-angle amounts measured from points in time at which the one-revolution signals for the first and second spindles are respectively generated in said step (c);
   (e) reducing the rotational speeds of the first and second spindles in accordance with the first and second rotational-angle amounts detected in said step (d) and causing the first and second spindles to be rotated at the same phase as one another; and
   (f) after execution of said step (e), performing speed control for the first and second spindles such that the first and second spindles are again rotated at the same rotational speed.

2. A spindle rotation control method according to claim 1, further including the steps of:
   (g) after the first and second spindles are controlled for rotation at the same rotational speed in said step (a), calculating first and second moving commands for the first and second spindles corresponding to the rotational speed;
   (h) performing position control of the first and second spindles on the basis of the first and second moving commands calculated in said step (g) and the rotational positions of the first and second spindles detected in said step (b); and
   (i) performing speed control of the first and second spindles in accordance with speed commands which are obtained by said position control in said step (h).

3. A spindle rotation control method according to claim 1, further including the steps of:
   (g) after execution of said step (e), periodically detecting the first and second rotational-angle amounts;
   (h) periodically discriminating whether or not a difference between the first and second rotational-angle amounts falls within a predetermined range; and
   (i) generating a phase synchronizing completion signal when the difference between said first and second rotational quantities discriminated in said step (h) becomes a value falling within the predetermined range.

4. A spindle rotation control method according to claim 2, further including the step of:
   (j) setting a ratio between a rotational speed of the first spindle and a rotational speed of a first motor operatively connected to the first spindle and a ratio between a rotational speed of the second spindle and a rotational speed of a second motor operatively connected to the second spindle in such a manner that these ratios are identical with each other;
   (k) setting a position gain in said position control for the first spindle and a position gain in said position control for the second spindle in such a manner that these position gains are identical with each other;
   (l) after execution of said step (e), periodically detecting first and second position deviation quantities for the first and second spindles;
   (m) periodically discriminating whether or not a difference between said first and second position deviation quantities detected in said step (l) falls within a predetermined range; and
   (n) generating a phase synchronizing control completion signal when said step (m) discriminates that the difference between said first and second position deviation quantities becomes a value falling within the predetermined range.

* * * * *